US012526203B2

(12) United States Patent
Lu et al.

(10) Patent No.: US 12,526,203 B2
(45) Date of Patent: Jan. 13, 2026

(54) METHOD AND SYSTEM FOR PERCEIVING AND ELIMINATING ABNORMAL STATE OF ACTIVE DISTRIBUTION NETWORK BASED ON DATA ENHANCEMENT

(71) Applicant: SHANDONG UNIVERSITY, Jinan (CN)

(72) Inventors: Tianguang Lu, Jinan (CN); Yingdong Xu, Jinan (CN); Shaorui Wang, Jinan (CN); Qian Ai, Jinan (CN); Xing He, Jinan (CN); Yueping Yang, Jinan (CN); Zhenhua Cai, Jinan (CN); Wenyu Lin, Jinan (CN); Xuedong Jiang, Jinan (CN); Haibin Zeng, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 19/068,261

(22) Filed: Mar. 3, 2025

(65) Prior Publication Data
US 2026/0005931 A1 Jan. 1, 2026

(30) Foreign Application Priority Data

Jul. 1, 2024 (CN) .......................... 202410864703.2

(51) Int. Cl.
H04L 41/16 (2022.01)
G06N 3/08 (2023.01)
(Continued)

(52) U.S. Cl.
CPC ............... H04L 41/16 (2013.01); G06N 3/08 (2013.01); H04L 41/0681 (2013.01); H04L 41/069 (2013.01); H04L 41/142 (2013.01)

(58) Field of Classification Search
CPC ... H04L 41/16; H04L 41/0681; H04L 41/069; H04L 41/142; G06N 3/08
See application file for complete search history.

(56) References Cited

U.S. PATENT DOCUMENTS

2018/0307994 A1* 10/2018 Cheng .................... G06N 5/022

FOREIGN PATENT DOCUMENTS

CN 113496262 A 10/2021
CN 113591905 A 11/2021
(Continued)

OTHER PUBLICATIONS

Douzas G, Bacao F. Effective data generation for imbalanced learning using conditional generative adversarial networks. Expert Systems with applications. Jan. 1, 2018;91:464-71. (Year: 2018).*

(Continued)

Primary Examiner — Michelle T Bechtold
Assistant Examiner — Nicholas S Wu
(74) Attorney, Agent, or Firm — IPro, PLLC; Na Xu

(57) ABSTRACT

Provided is a method for perceiving and eliminating an abnormal state of active distribution network based on data enhancement, including: acquiring, by synchrophasor measurement device, data of each node of active distribution network in target domain in real-time and transmitting to processor; inputting the acquired data into a classification model, and outputting abnormal detection and classification results in real time; and analyzing the abnormal detection and classification results, and transmitting an abnormal state eliminating instruction to a distribution terminal to eliminate the abnormal state. Wherein, hidden distribution features in node data of active distribution network are mined through dynamic clustering, a large amount of unlabeled data are clustered, a data label is generated through self-coding and label correction rule, training samples with balanced category distribution is generated through data enhancement and is used to train the classification model based on dynamic graph attention network by domain adaption method.

6 Claims, 5 Drawing Sheets

(51) Int. Cl.
    *H04L 41/0681* (2022.01)
    *H04L 41/069* (2022.01)
    *H04L 41/142* (2022.01)

(56) References Cited

FOREIGN PATENT DOCUMENTS

| | | |
|---|---|---|
| CN | 113988215 A | 1/2022 |
| CN | 117611918 A | 2/2024 |
| CN | 117789207 A | 3/2024 |

OTHER PUBLICATIONS

Du H, Li Z, Chen R, Yin Z, Fu Z, Zhang Q, Xiao X, Luo M, Bao F. Dynamic time warping and spectral clustering based fault detection and diagnosis of railway point machines. In2019 IEEE Intelligent Transportation Systems Conference (ITSC) Oct. 27, 2019 (pp. 595-600). IEEE. (Year: 2019).*

Yang X, Deng C, Liu T, Tao D. Heterogeneous graph attention network for unsupervised multiple-target domain adaptation. IEEE Transactions on Pattern Analysis and Machine Intelligence. Sep. 23, 2020;44(4):1992-2003. (Year: 2020).*

Wang S, Lu T, Hao R, Wang F, Ding T, Li J, He X, Guo Y, Han X. An identification method for anomaly types of active distribution network based on data mining. IEEE Transactions on Power Systems. Jun. 22, 2023. (Year: 2023).*

Liang L, Zhang H, Cao S, Zhao X, Li H, Chen Z. Fault location method for distribution networks based on multi-head graph attention networks. Frontiers in Energy Research. May 27, 2024;12:1395737. (Year: 2024).*

Yang, Nien-Che, and Jen-Ming Yang. "Fault classification in distribution systems using deep learning with data preprocessing methods based on fast dynamic time warping and short-time fourier transform." IEEE Access 11 (2023): 63612-63622. (Year: 2023).*

Prabhu H, Valadi J, Arjunan P. Generative Adversarial Network with Soft-Dynamic Time Warping and Parallel Reconstruction for Energy Time Series Anomaly Detection. arXiv preprint arXiv:2402.14384. Feb. 22, 2024. (Year: 2024).*

Wang, Tingyin; Lin, Minggui; Chen, Da; Wu, Yunping; Emergency Data Transmission Based on Beidou RDSS in RMS, Computer Systems and Applications, No. 12, Dec. 15, 2019.

"LV, Tianguang, Research on Generator Strategic Bidding Based on Bounded Rationality Model of BSV and Breakpoints Optimization , Transactions of China Electrotechnical Society, Feb. 6, 2023".

LV, Tianguang, research on state assessment method of key equipment in distribution network , 2023 8th Asia conference on power and electrical engineering, May 31, 2023.

\* cited by examiner

METHOD AND SYSTEM FOR PERCEIVING AND ELIMINATING ABNORMAL STATE OF ACTIVE DISTRIBUTION NETWORK BASED ON DATA ENHANCEMENT

CROSS-REFERENCE TO RELATED APPLICATIONS

This patent application claims the priority of Chinese Patent Application No. 202410864703.2 filed with the China National Intellectual Property Administration on Jul. 1, 2024, and entitled "METHOD AND SYSTEM FOR PERCEIVING ABNORMAL STATE OF ACTIVE DISTRIBUTION NETWORK BASED ON DATA ENHANCEMENT", the entire content of which is incorporated by reference in the present application to constitute a part of the present disclosure for all objectives.

TECHNICAL FIELD

The present disclosure relates to the technical field of abnormal state perception and classification of distribution networks, and in particular to a method and system for perceiving and eliminating an abnormal state of an active distribution network based on data enhancement.

BACKGROUND

With the rapid development of information and communication technology, micro synchrophasor measurement units, advanced measurement infrastructure and other measurement devices are widely deployed in the distribution network, which provides a solid data foundation for the operation state perception of the distribution network. However, with large-scale distributed power supplies connected to the distribution network, the structure of the distribution network (which is an active distribution network) is becoming more and more complex and the scale is expanding, resulting in a huge scale of its operating data and complex fault mechanism. These problems make it difficult for traditional fault diagnosis methods to diagnose faults from complex data in time and accurately, and the diagnosis cost is high.

To solve the problems of difficult fault diagnosis and abnormal state perception of the active distribution network, artificial intelligence technology is widely used in fault diagnosis of the active distribution network due to the advantages of feature self-learning and strong nonlinear fitting. Common intelligent fault diagnosis methods include an expert system, an artificial neural network, a Bayesian network, a fuzzy set theory, a Petri net, an optimization algorithm and the like. The expert system establishes a knowledge base by summarizing expert knowledge, which has strong reasoning and explanation ability, but is only suitable for simple fault handling. The artificial neural network simulates a neuron network of human brain, and adjusts a mapping relationship between neurons through sample learning, making a function relationship between input and output approach a real law. The Bayesian network infers the probability of fault occurrence by using prior probability and related knowledge, and displays the diagnosis results in the form of probability. The fuzzy set theory describes the degree of a fault feature belonging to a fault through the membership degree, and quantifies a fuzzy fault causal relationship, thus facilitating reasoning and calculation. The Petri net (the Petri net is the mathematical representation of a discrete parallel system) can effectively solve the problem of fault diagnosis of the active distribution network by performing fault diagnosis based on models or knowledge, but there are limitations in the scale of fault handling. The optimization algorithm takes a hypothetical fault as a variable and the matching degree thereof with a fault signal as the fitness to search out the hypothetical fault with the highest fitness through iterative optimization.

With the changing structure and scale of the active distribution network and the explosive growth of the data scale, the processing cost and analysis result of fault data greatly depend on the choice of methods. However, the above fault diagnosis method combined with the artificial intelligence technology is only implemented by using a single model or algorithm, and in the process of data processing and feature extraction, the temporal and spatial features of the fault data are often ignored, resulting in low accuracy of the final fault diagnosis. In addition, there are also limitations such as poor adaptability to distribution networks with unknown operating conditions and strong dependence on initial data labels, which all affect the accuracy of the final abnormal state perception. Therefore, there is an urgent need for an adaptive method for fault perception, classification and elimination of an active distribution network, which can effectively process and mine the ever-changing fault data, implement accurate and intelligent perception of an abnormal state of the active distribution network, and improve the accuracy of eliminating the abnormal state of the active distribution network.

SUMMARY

To solve the shortcomings in the prior art, the present disclosure provides a method and system for perceiving and eliminating an abnormal state of an active distribution network based on data enhancement. Ever-changing fault data is effectively processed and mined by using a data mining-enhancement framework based on dynamic clustering and data enhancement, and the complex abnormal state of the active distribution network is accurately positioned and classified by using a dynamic graph attention network and a domain adaption method, so that the accurate intelligent perception and fault classification of the abnormal state of the active distribution network can be implemented, and the abnormal state of the active distribution network can be accurately eliminated.

According to a first aspect, the present disclosure provides a method and system for perceiving and eliminating an abnormal state of an active distribution network based on data enhancement.

The method for perceiving and eliminating an abnormal state of an active distribution network based on data enhancement, including:

acquiring, by a synchrophasor measurement device, data of each node of the active distribution network in a target domain in real time, and transmitting the acquired real-time data to a processor;

inputting, by the processor, the acquired data into a trained classification model, and outputting abnormal detection and classification results in real time;

analyzing, by the processor, the abnormal detection and classification results, determining the position of the node with the abnormal state in the active distribution network in the target domain and the category and severity of the abnormal state, and transmitting an abnormal state eliminating instruction to a distribution terminal of the active distribution network in the target domain; and receiving, by the distribution terminal, the abnormal state eliminating instruction, and controlling a corresponding circuit breaker or load according to a predefined fault processing measure to break to eliminate the abnormal state;

wherein, a training process of the classification model includes:

acquiring data of each node of the active distribution network after a fault occurs to construct structured graph data;

clustering data of each node in the graph data by means of dynamic clustering based on dynamic time warping, and generating a category label for data of each node by using a self-coding and label correction rule to construct a data set;

determining unbalanced information of each abnormal category based on the constructed data set, and performing data enhancement on a minority category by a conditional generative adversarial network to acquire a labeled balanced data set after sample distribution adjustment; and training a classification model based on a dynamic graph attention network by taking data in the balanced data set as source domain data, combining unlabeled target domain data and using a domain adaption method.

According to a second aspect, the present disclosure provides a system for perceiving and eliminating an abnormal state of an active distribution network based on data enhancement.

The system for perceiving and eliminating an abnormal state of an active distribution network based on data enhancement, including:

a synchrophasor measurement device, mounted at each node of the active distribution network in a target domain and configured to acquire data of each node of the active distribution network in a target domain in real time; and a processor, including the following functional modules:

a data acquisition module, configured to acquire data of each node of the active distribution network after a fault occurs to construct structured graph data;

a data labeling module, configured to cluster data of each node in the graph data by means of dynamic clustering based on dynamic time warping, and generate a category label for data of each node by using a self-coding and label correction rule to construct a data set;

a balanced data set construction module, configured to determine unbalanced information of each abnormal category based on the constructed data set, and perform data enhancement on a minority category by a conditional generative adversarial network to acquire a labeled balanced data set after sample distribution adjustment;

a model training module, configured to train a classification model based on a dynamic graph attention network by taking data in the balanced data set as source domain data, combining unlabeled target domain data and using a domain adaption method; and an abnormal state perception module, configured to acquire real-time data of each node of the active distribution network in a target domain, input the acquired real-time data into a trained classification model, and output abnormal detection and classification results in real time;

wherein, the processor is configured to analyze the abnormal detection and classification results, to determine the position of the node with the abnormal state in the active distribution network in the target domain and the category and severity of the abnormal state, and to transmit an abnormal state eliminating instruction to a distribution terminal of the active distribution network in the target domain; and the distribution terminal is configured to receive the abnormal state eliminating instruction, and to control a corresponding circuit breaker or load according to a predefined fault processing measure to break to eliminate the abnormal state.

One or more of the above technical solutions have the following beneficial effects:

the present disclosure provides a method and system for perceiving and eliminating an abnormal state of an active distribution network based on data enhancement. The complex abnormal state of the active distribution network is accurately positioned and classified by using a data mining-enhancement framework, a dynamic graph attention network and a domain adaption method. In the present disclosure, abnormal state data is effectively processed based on the data mining-enhancement framework, a known fault is positioned and classified by the dynamic graph attention network, and the domain adaption method is used to deal with the unknown operation condition and the frequent topological changes of the active distribution network, so that the problems of low accuracy and long time in fault positioning and classification of the active distribution network can be solved pertinently, and it is helpful to improve the intelligent perception level of the active distribution network, thereby shortening the identification time of the abnormal state and reducing the power outage loss.

In the present disclosure, the complex abnormal state of the active distribution network is accurately positioned and classified by using a data mining-enhancement framework, a dynamic graph attention network and a domain adaption method. The data mining-enhancement framework includes dynamic clustering and data enhancement, hidden distribution features in the node data of the active distribution network are mined through the dynamic clustering to preliminarily cluster and classify a large amount of unlabeled data, a data label is generated through a self-coding and label correction rule, and data unbalance information is acquired by using the data enhancement and according to the classification result to generate sufficient training samples with balanced category distribution, thus providing a high-quality data foundation for abnormal state perception. A classification model based on the dynamic graph attention network is constructed, aiming at enhancing a dynamic dependency relationship between nodes, capture temporal and spatial distribution features of operation data of the active distribution network and improve the accuracy of abnormal state perception. The dynamic graph attention network is trained by the domain adaption method and depending on high-quality data provided by the data enhancement-mining framework, the perception ability and the separability on unknown operation conditions are improved through the domain migration at the global and local levels. By the above solutions and according to the present disclosure, accurate intelligent perception and fault classification of the abnormal state of the active distribution network are implemented, and the accuracy of eliminating the abnormal state of the active distribution network is improved.

BRIEF DESCRIPTION OF THE DRAWINGS

The accompanying drawings constituting a part of the present disclosure are used to provide a further understanding of the present disclosure. The exemplary examples of the present disclosure and descriptions thereof are used to explain the present disclosure, and do not constitute an improper limitation of the present disclosure.

DETAILED DESCRIPTION

Figure 1:
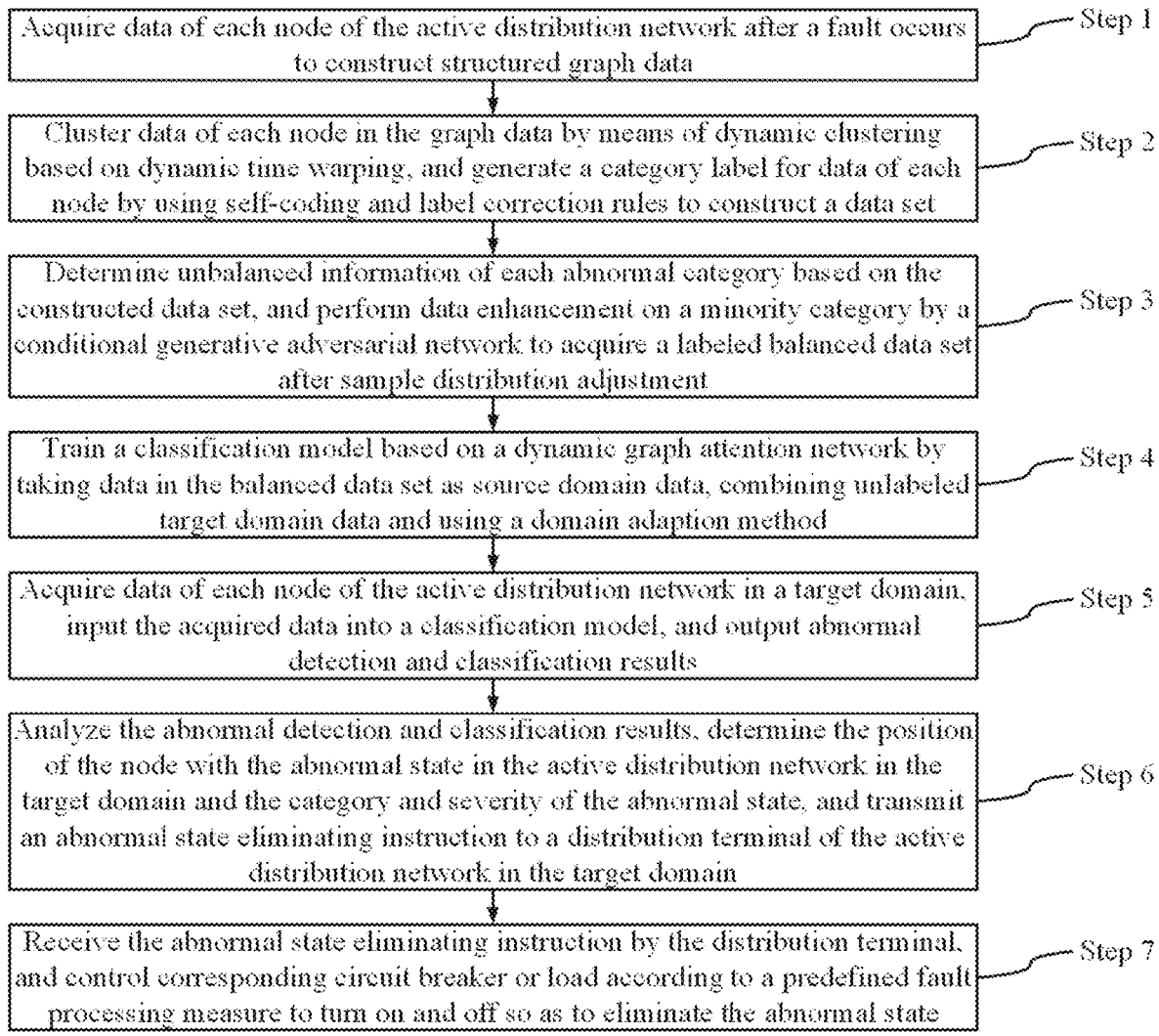
FIG. 1 is an overall flowchart of a method for perceiving an abnormal state of an active distribution network based on data enhancement according to an example of the present disclosure.

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs. In addition, it should further be understood that, terms "include" and/or "including" used in this specification indicate that there are features, steps, operations, devices, components, and/or combinations thereof.

Example 1

The present example provides a method for perceiving and eliminating an abnormal state of an active distribution network based on data enhancement. The method includes:
  acquiring, by a synchrophasor measurement device, data of each node of the active distribution network in a target domain in real time, and transmitting the acquired real-time data to a processor;
  inputting, by the processor, the acquired data into a trained classification model, and outputting abnormal detection and classification results in real time;
  analyzing, by the processor, the abnormal detection and classification results, determining the position of the node with the abnormal state in the active distribution network in the target domain and the category and severity of the abnormal state, and transmitting an abnormal state eliminating instruction to a distribution terminal of the active distribution network in the target domain; and
  receiving, by the distribution terminal, the abnormal state eliminating instruction, and controlling a corresponding circuit breaker or load according to a predefined fault processing measure to break to eliminate the abnormal state;
  wherein, a training process of the classification model includes:
  acquiring data of each node of the active distribution network after a fault occurs to construct structured graph data;
  clustering data of each node in the graph data by means of dynamic clustering based on dynamic time warping, and generating a category label for data of each node by using a self-coding and label correction rule to construct a data set;
  determining unbalanced information of each abnormal category based on the constructed data set, and performing data enhancement on a minority category by a conditional generative adversarial network to acquire a labeled balanced data set after sample distribution adjustment; and
  training a classification model based on a dynamic graph attention network by taking data in the balanced data set as source domain data, combining unlabeled target domain data and using a domain adaption method.

In the method for perceiving and eliminating the abnormal state of the active distribution network based on data enhancement provided by the present example, the emphasis is on the construction and training of the classification model based on the dynamic graph attention network, and finally high-precision abnormal state perception and classification are implemented by using the trained classification model. Therefore, the training process of the model is introduced in detail at first.

Considering that the existing solution of abnormal state perception and classification (that is, fault detection and classification) of the active distribution network based on artificial intelligence only adopts a single model or algorithm, the model highly depends on the initial data label and the model has poor adaptability to unknown conditions, which leads to the problem of low fault diagnosis accuracy, in the model training method provided by the present example, the data mining-enhancement framework is proposed in step S1 to step S3, so data is labeled and the data in the training set is balanced to provide a high-quality data foundation for the abnormal state perception. The dynamic graph attention network is proposed in step S4, the dynamic dependence relationship between the nodes is enhanced by improving the network structure, the temporal and spatial features of the operation data of the active distribution network are captured, the accuracy of abnormal state perception of the model is improved, and the perception ability and the separability of the model on unknown operation conditions are improved. The final classification model is obtained through the training of the above steps, and finally, the abnormal state perception of the current active distribution network is implemented by the model and through step S5.

As shown in FIG. 1, step S1: acquiring data of each node of the active distribution network after a fault occurs to construct structured graph data. The node data is timing voltage data of a node, and the voltage data includes an amplitude and a phase of a voltage.

Non-Euclidean structured graph data is constructed in the step S1. Specifically, in the graph theory, a graph is a mathematical structure composed of nodes and edges. The network topology of the active distribution network can be regarded as an undirected graph, buses thereof (nodes) can be regarded as the nodes of the graph, and transmission lines can be regarded as the edges of the graph. First, one piece of graph data capable of accurately describing the topology structure of the active distribution network is defined, and can be expressed as:

$$G=(V,E,L) \quad (1)$$

Where, $V=\{V_1, V_2, \ldots, V_n\} \in \mathbb{R}^{n \times t}$ is a node set, n represents the number of nodes, t represents the number of sampling time series, $E \in \mathbb{R}^{2 \times 2m}$ is an edge set, m is the number of edges, 2m indicates that the graph is an undirected graph, and L∈ ℝ $^{1×n}$ represents the label of the data. In the present example, detection and classification of four short-circuit faults (including single-phase grounding short circuit, two-phase interphase short circuit, two-phase grounding short circuit and three-phase short circuit) and a disconnection fault are considered.

Further, after the nodes of the distribution network are selected as the nodes of the graph data, node voltage data in a time period before and after the fault occurs is collected by a micro synchrophasor measurement unit, advanced measurement infrastructure, a smart electric meter and other distribution network measurement devices, that is, n pieces of voltage phasor data including fault mutation time are sampled in fixed time, the amplitude U∈ ℝ $^{n×t}$ and the phasor θ∈ ℝ $^{n×t}$ of the voltage phasor data are used as two groups of node feature tensors, and topology structure information of the distribution network is added through the edge set E. Since the cost of manually labeling data is excessively high, there are a large amount of unlabeled data in the collected fault data, so the labels L of most data are empty sets.

Step S2: clustering data of each node in the graph data by means of dynamic clustering based on dynamic time warping, and generating a category label for data of each node by using a self-coding and label correction rule to construct a data set.

In the step S2, the dynamic clustering mainly includes five aspects: feature standardization for ensuring that different data features have similar scales; dynamic time warping (DTW) for calculating the distance between time series data; a clustering center calculation function for iteratively calculating the average value of all data in the cluster as a new clustering center; a clustering confidence for measuring the confidence of the node data belonging to a specific cluster; and self-coding and label correction rules for generating a pseudo label and performing correction.

Step S2.1: performing standardized processing based on data of all nodes in the graph data. Specifically, assuming that the feature of the node $V_i$ is $\{x_{i,r} \in \mathbb{R}^t | V_i \in V\}$, the node features of the graph data are linearly scaled to a specified range by a Z-score standardization method, thereby facilitating the comparison and weighting of the feature values of different faults. The formula is:

$$x_i = \frac{x_{i,r} - \mu}{\sigma} \qquad (2)$$

Where, $x_{i,r}$ represents unprocessed raw data of the $i^{th}$ node at a certain moment, $x_i$ represents standardized data of the $i^{th}$ node at a certain moment, μ represents a mean value, and σ represents a standard deviation.

Step S2.2: randomly selecting K node samples as an initial clustering center by taking node data as a node sample, and calculating a distance between each node sample and the initial clustering center through a dynamic time warping method, where K is the number of existing abnormal categories.

In the present example, initial clustering is performed by a dynamic time warping method. The dynamic time warping (DTW) method is a distance measurement method for comparing the similarity of different time series data. Compared with the traditional Euclidean distance measurement method in a K means clustering algorithm, the DTW method considers the alignment of a time axis in a time series and allows the series to be extended or compressed on the time axis, thereby improving the limitation of the traditional Euclidean distance algorithm and effectively improving the clustering effect of the voltage time series data. Assuming that the time series features (that is, the voltage time series data of the node) after any two different nodes are standardized are respectively X=($x_1$, $x_2$, ..., $x_t$) and Y=($y_1$, $y_2$, ..., $y_t$), the lengths thereof are the sampling number t, and the DTW distance is calculated by a dynamic programming method, with the calculation formula as follows:

$$DTW(i, j) = dist(x_i \cdot y_j) + \min \begin{cases} DTW(i-1, j) \\ DTW(i, j-1) \\ DTW(i-1, j-1) \end{cases} \qquad (3)$$

Where, i and j respectively represent current indexes of two time series, DTW (i, j) represents a minimum cumulative distance from a starting point of the series X to an $i^{th}$ element and from a starting point of the series Y to a $j^{th}$ element, and dist ($x_i \cdot y_j$) represents a local distance between the $i^{th}$ element in the series X and the $j^{th}$ element in the series Y. In the calculation process of the DTW distance, the local distance and the minimum cumulative distance are calculated step by step through dynamic programming until the calculation of the whole time series is completed, and the final minimum cumulative distance of the nodes is obtained.

A distance from each node to K randomly selected initial clustering centers is calculated by the DTW method.

Step S2.3: assigning each node sample to a cluster where the nearest cluster center is located to update the clustering center of each cluster. Specifically, in K means clustering, each node sample is assigned to the nearest clustering center according to the DTW distance to form multiple clusters. The clustering center $C_j^{new}$ of each cluster j is updated. The clustering center is calculated as the average time (that is, average time series) of all samples in the cluster, with the calculation formula as follows:

$$C_j^{new} = \frac{1}{|s_j|} \sum_{x_i \in S_j} x_i \qquad (4)$$

Where, $S_j$ is a sample set belonging to the cluster j, and $C_j^{new}$ is the clustering center after the cluster j is updated.

Step S2.4: performing cyclic iterative calculation based on the updated clustering center until a stopping condition is met, thus completing clustering division of data of all nodes. Specifically, after the updated clustering center is obtained, the calculation of steps S2.2 to S2.3 is iterated circularly until the stop condition is met, that is, the clustering center no longer changes or reaches the maximum number of iterations. At this time, the clustering division of all node data is completed.

Step S2.4: calculating a silhouette coefficient of each node sample after the final clustering division to evaluate a clustering confidence.

In the present example, the confidence of the clustering result of the node data is evaluated by the silhouette coefficient and is used as one of indexes of iterative optimization. The silhouette coefficient is an index of the silhouette clarity of each category after clustering, including two factors: a degree of cohesion and a degree of separation.

First, for each node sample in each cluster after clustering division, the degree of cohesion of the node sample is calculated, the degree of cohesion a(i) can reflect the closeness between a certain node sample and an intra-class, that is, an average distance between the node sample and other node samples in the same cluster, with the calculation formula as follows:

$$a(i) = \frac{1}{|C_i| - 1} \sum_{j \in C_i, j \neq i} d(i, j) \qquad (5)$$

Where, $C_i$ is all units in the same cluster as the node i, and d(i, j) is a distance between the node i and the node j.

Second, the degree of separation of the node sample is calculated, and the degree of separation b(i) can reflect the closeness between a certain node sample and an intra-class element, that is, an average distance between the node sample and other node samples in the nearest cluster. Specifically, the calculation formula of b(i) is similar to the calculation formula of a(i), except that it is necessary to traverse other clusters to obtain multiple values and select the minimum value from the multiple values (equivalently, selecting the result calculated by the nearest cluster) as the final result, with the calculation formula as follows:

$$b(i) = \min_{C_k \neq C_i} \frac{1}{|C_i|} \sum_{j \in C_k} d(i, j) \qquad (6)$$

Where, $C_k$ is other clusters not including the node i.

Finally, the silhouette coefficient of the node sample is calculated based on the degree of the cohesion and the degree of separation of the node sample. The silhouette coefficient is calculated as follows:

$$s(i) = \frac{b(i) - a(i)}{\max(a(i), b(i))} \qquad (7)$$

The range of the silhouette coefficient s(i) is [−1,1]. If the silhouette coefficient is closer to 1, it shows that the better the clustering effect and the higher the clustering confidence.

Step S2.5: coding the node data after clustering and classification by using a self-coding method to generate a pseudo label. Specifically, after the K means clustering algorithm, the data sample of each cluster has specific similarity, but due to the label missing of part of data, it is impossible to determine which abnormal category this part of data belongs to. For further processing, the present example adopts a self-coding method to code the data that has passed the dynamic clustering and classification. To retain the key information of the raw data, for example, the node where the data is located and the cluster where the data is located, the following coding rule is used for self-coding:

$$G0N0C \qquad (8)$$

Where, G represents a serial number of the undirected graph where the data is located so as to retain the integrity of the topology structure of the distribution network, N represents a node position where the data is located, C represents a cluster to which the data belongs, and two zeros in the middle are convenient for identification and have not real meaning. Assuming that certain data is self-coded, taking the data format of 140803 as an example, 140803 indicates that the voltage data of the node 8 at a certain moment belongs to the cluster 3.

After the initial node data is subjected to feature standardization, dynamic time warping, mean clustering and self-coding processing, there is a group of pseudo label G0N0C of data coding, the label of the graph data is updated according to the graph number, the node position and the clustering category information of the pseudo label, making each node include a preliminarily determined clustering label.

To further improve the accuracy and consistency of the label, step S2.6 is performed, the pseudo label is corrected by using a rule-based label correction method to generate a final category label for data of each node. The rule-based label correction method uses a clustering majority rule, and the label of the whole cluster is determined by the majority of known real labels in each cluster, in this case, the pseudo label can be corrected through the rule and according to the part of the known real label information, thereby improving the accuracy and consistency of the label rapidly. Specifically, for each cluster, the real label type that appears most frequently in the cluster is used as the label of all node samples in the cluster to replace the pseudo label generated by self-coding.

By the above steps, the node data is preliminarily classified through dynamic clustering, and the data label is generated through self-coding and label correction to distinguish the unbalance degree of various abnormal state data. Afterwards, for the unbalanced information of the acquired data, the number of scarce samples is expanded by using the conditional generative adversarial network and through the data enhancement method.

That is, step S3: determining unbalanced information of each abnormal category based on the constructed data set, and performing data enhancement on a minority category by a conditional generative adversarial network to acquire a labeled balanced data set after sample distribution adjustment.

The data enhancement in the step S3 is mainly composed of a category weight calculation function and a conditional generative adversarial network (CGAN). The abnormal category of the node data is counted by the category weight calculation function, the category weight is calculated by the category frequency to screen out the minority of the abnormal categories. The minority of abnormal categories are subjected to specific data enhancement processing by the conditional generative adversarial network according to the unbalanced information of the type, and the problem of data unbalance is improved by re-adjusting the sample distribution of the data set.

Step S3.1: counting the number of node samples in each category in the data set according to the category label to obtain a frequency of each category. Specifically, assuming that there are totally K categories in the data set, for the $i^{th}$ category, the number of the samples is Ni, the total number of the samples is N, and the frequency $f_i$ of the category can be calculated as follows:

$$f_i = \frac{N_i}{N} \qquad (9)$$

Step S3.2: calculating a category weight of each category based on the frequency of each category, and screening a minority category in the abnormal category. Specifically, the category weight is calculated by the category frequency. The present example adopts the reciprocal of the category frequency as the weight, and the weight is normalized. The calculation formula of the category weight $\omega_i$ is as follows:

$$\omega_i = \frac{1/f_i}{\sum_{j=1}^{K}(1/f_i)} \tag{10}$$

In each abnormal type, the majority accounts for a larger weight, the minority accounts for a smaller weight, and the sum of all the category weights is ensured to be 1. The category with the large weight has a greater influence on the raining of the generator so as to generate more minority data.

Step S3.3: taking the category label and the category weight as an additional condition variable of the conditional generative adversarial network, inputting a noise vector and the additional condition variable into a generator in the conditional generative adversarial network, controlling generation of unbalanced category node data through the category weight so as to generate sample data; jointly inputting the additional condition variable and the generated sample data or authentic sample data into a discriminator in the conditional generative adversarial network for discrimination; performing alternating iterative training for the generator and the discriminator until reaching the maximum number of iterative rounds; and, using the trained generator to generate balanced node data of the abnormal category to construct the data set.

The conditional generative adversarial network (CGAN) is a generative adversarial network variant model including conditional constraints, which guides the generation of data samples by introducing additional information conditions in the construction process of the generator and the discriminator, thus improving the controllability of generating data patterns by the traditional generative adversarial network. In the present example, the category label and the category weight are taken as the additional condition variable of CGAN, thereby improving the ability and controllability of generating the minority sample by the model.

Specifically, the time series features of different nodes are still expressed as $X=(x_1, x_2, \ldots, x_t)$, the actual distribution which the known node sample X complies with is $P_r$, and there is a group of noise vectors Z complying with Gaussian distribution $P_z$. Through the establishment of a mapping relationship model between $P_r$ and $P_z$, a balanced sample set meeting the real distribution and having a certain anti-interference ability can be generated based on random noise.

Figure 3:
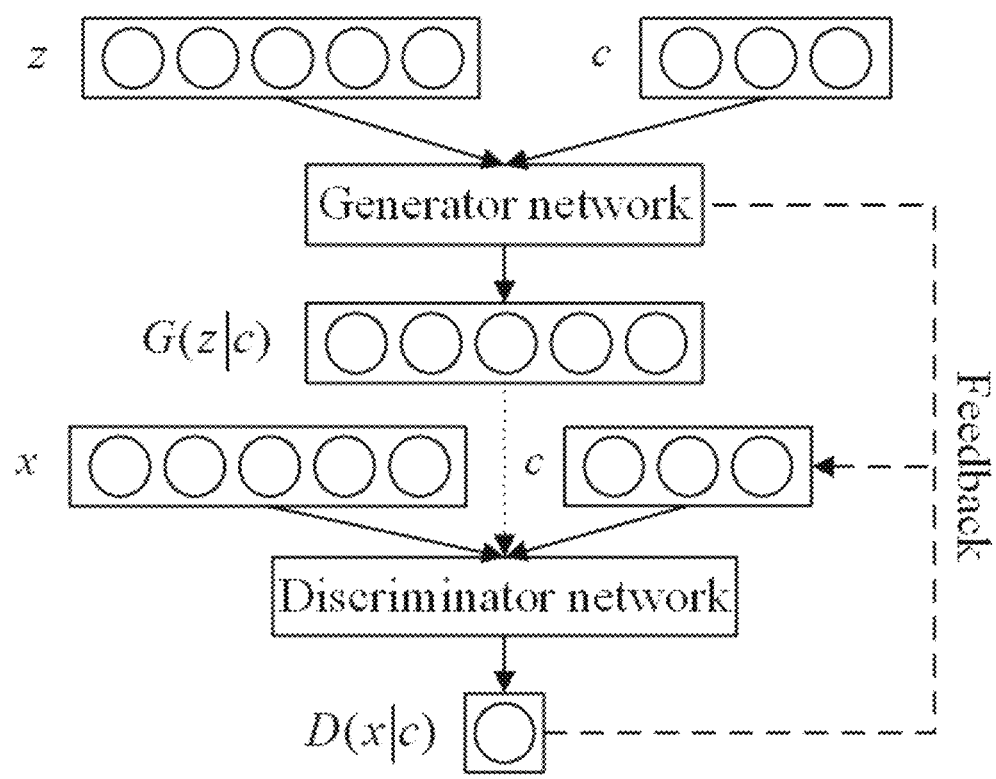
FIG. 3 is a structural schematic diagram of a conditional generative adversarial network used in an example of the present disclosure.

Similar to the traditional generative adversarial network, the conditional generative adversarial network includes a generator network $G(Z:\theta^{(G)})$ and a discriminator network $D(X:\theta^{(D)})$, where $\theta^{(G)}$ represents a weight parameter of the generator network, and $\theta^{(D)}$ represents a weight parameter of the discriminator network. The basic structure of the conditional generative adversarial network is shown in FIG. 3, and an objective of the generator network is to generate a data sample as close as possible to the real distribution $P_r$. In the training process of CGAN, the input of the generator network is that random noise Z sampled through prior distribution $P_z$ is gradually transformed into an output vector with the same dimension as a real fault sample X through a multi-layer neural network; and the objective of the discriminator is to determine whether the data input into the discriminator network belongs to real data or generated data, and the data is also trained using the multi-layer neural network. The generator and discriminator networks compete with each other through games, and are continuously optimized through the adversarial training and the backward propagation algorithm until the data generated by the generator cannot be discriminated by the discriminator. The loss functions of the generator network and the discriminator network are respectively as follows:

$$L_G = E_{Z \sim P_z}[\ln(1-D(G(Z)))] \tag{11}$$

$$L_D = -E_{X \sim P_r}[\ln D(X)] - E_{Z \sim P_z}[\ln(1-D(G(Z)))] \tag{12}$$

Where, E(•) represents calculation expectation, G(Z) represents a generated sample generated by the generator, and D(~) represents an output result of the discriminator.

A training target function of CGAN without conditional restriction is constructed by combining the loss functions of the generator and the discriminator, as shown in the following function:

$$\min_G \max_D V(G,D) = E_{X \sim P_r}[\ln D(X)] + E_{Z \sim P_z}[\ln(1-D(G(Z)))] \tag{13}$$

After conditional restriction information (that is, an additional condition variable or referred to as a category condition C) is added, the noise vector Z and the category condition C are input to the generator in the conditional generative adversarial network and are spliced and combined by the generator to form a brand new implicit representation, and the generation of the unbalanced category data is controlled by the category weight; and the category condition C and the generated sample data or real sample data are jointly input to the discriminator, and the discriminator performs discrimination. The final CGAN training target function is shown in the following formula:

$$\min_G \max_D V(G,D) = \tag{14}$$
$$E_{X \sim P_r}[\ln D(X|C)] + E_{Z \sim P_z}[\omega_i \cdot \ln(1-D(G(Z|C)|C))]$$

A Nash equilibrium point between the generator and the discriminator can be reached by performing alternative iterative optimization training on the generator and the discriminator, that is, the generator can synthesize the generated sample which is difficult for the discriminator to discriminate.

The noise vector and the additional condition variable are input into the generator by using the trained generator and taking the category label and the category weight as the additional condition variable so as to generate balanced node data of the abnormal category to construct the data set.

Step S3.4: performing dynamic clustering on the constructed data set again, and calculating and updating a clustering confidence and a category weight after clustering; and, according to the updated cluster confidence and category weight, compared with a preset threshold condition, if the condition is met, the data set is taken as a labeled balanced data set and the labeled balanced data set is acquired at this time, otherwise, performing clustering and generation again until the condition is met.

Figure 2:
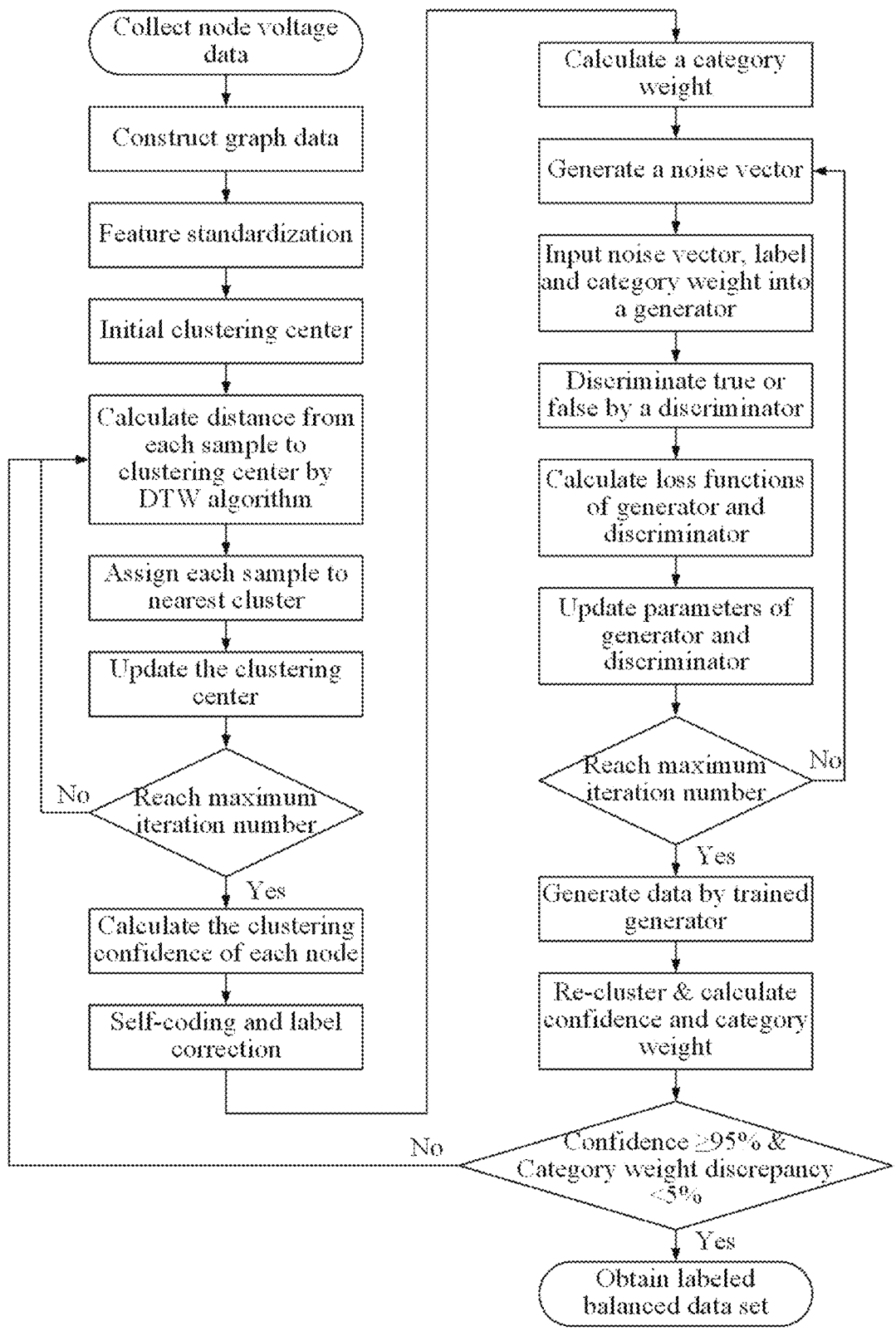
FIG. 2 is a flowchart of a data mining-enhancement framework used in an example of the present disclosure.

Specifically, as shown in FIG. 2, based on the above data mining-enhancement method, various abnormal category data is continuously classified through iterative optimization, and new minority data is generated until the clustering confidence of each node reaches 95% and the category weight discrepancy is less than 5%, and the data constructed when the condition is met is marked as the labeled balanced data set.

Step S4: training a classification model based on a dynamic graph attention network by taking data in the balanced data set as source domain data, combining unlabeled target domain data and using a domain adaption method.

In the present example, a classification model based on a dynamic graph attention network is constructed, where the dynamic graph attention network adopts a dynamic attention mechanism, and the dynamic attention mechanism is an improvement of an attention mechanism in an existing graph attention network (GAT).

Specifically, a graph neural network (GNN) can update the node representation thereof through a massage passing mechanism, and the process includes two steps of aggregating and updating a message. If the feature of the known node $V_i$ is $\{x_{i,r} \in \mathbb{R}^{r'} | V_i \in V\}$, the message passing process can be defined as follows:

$$x_i' = g_\theta(x_i, AGG\{x_j | j \in n\}))  \quad (15)$$

Where, $g_\theta(\cdot)$ and $AGG(\cdot)$ represent the processes of updating and aggregating the node features of the GNN model, respectively. In the general graph neural network system structure, the aggregation weights of all neighbor nodes are equal, which limits the representation ability of the GNN model. In the graph attention network (GAT), the process of updating the node features depends on the edge weights learned by the attention mechanism, so the message passing process is changed as follows:

$$x_i' = \prod_{k=1}^{K} \sigma\left(\sum_{j \in n} \alpha_{ij}^{(k)} \cdot W_g^{(k)} x_j\right) \quad (16)$$

Where, $\|$ is a concatenation operator, K is the number of attention heads, and the representation ability of GAT can be increased by a multi-head attention mechanism; $\alpha_{ij}$ represents a learning weight between nodes $V_i$ and $V_j$ of the $k^{th}$ attention head; and $W_g^{(k)} \in \mathbb{R}^{t' \times t}$ represents the linear change of the node features of the $k^{th}$ attention head.

In the traditional GAT model, the attention mechanism is defined as:

$$e_{ij} = \text{LeakyReLu}(a^T(Wx_i | Wx_j)) \quad (17)$$

$$\alpha_{ij} = \text{Softmax}(e_{ij}) = \frac{\exp(e_{ij})}{\sum_{k \in n} \exp(e_{ik})} \quad (18)$$

Where, $e_{ij}$ represents an attention score between nodes $V_i$ and $V_j$; $a \in \mathbb{R}^{2t'}$ represents an attention mechanism, generally a linear neural network; $\alpha_{ij}$ represents a learning weight after the attention score is normalized, with a value between an interval $[0,1]$; Softmax is a normalization function, and LeakyReLu is an activation function.

That is, the GAT model can show the importance of features between nodes $V_i$ and $V_j$, and can enhance the feature extraction ability of the GNN model. However, as can be seen from the expression of the attention score $e_{ij}$ that the GAT model has two continuous linear change layers: $a^T$ and W. The series operation will not affect the linear property of the network, so $a^T$ and W can be combined to form a single-layer linear neural network, as shown in the following formula:

$$e_{ij} = \text{LeakyReLu}(a_1^T W x_i + a_2^T W x_j) \quad (19)$$

Where, $a_1, a_2 \in \mathbb{R}^{t'}$, and $a = a_1 \| a_2$.

Since the node V is limited, a node $V_{jmax} \in V$ is present, making $a_2^T W x_{jmax}$ be the maximum in all nodes. For any neighbor nodes of $V_j$, the maximum attention only can be obtained through $V_{jmax}$, and thus the attention of the GAT model mainly focuses on one node and only can learn the static attention representation.

To achieve the dynamic attention representation, the present example adopts a nonlinear activation function to separate two linear change layers, and the formula of the attention score $e_{ij}$ is changed as follows:

$$e_{ij} = a^T \text{LeakyReLu}(W[x_i \| x_j]) \quad (20)$$

Where, et represents an attention score between nodes $V_i$ and $V_j$, $x_i$ represents node data of the $i^{th}$ node $V_i$; a represents an attention mechanism, which is a linear change layer; and W represents the linear change of the node features, which is the other linear change layer.

The dynamic graph attention network (DGAT) and the GAT model have the same time complexity, and thus the dynamic graph attention network improves the performance of the model without additionally increasing calculation time and calculation resources.

Figure 4:
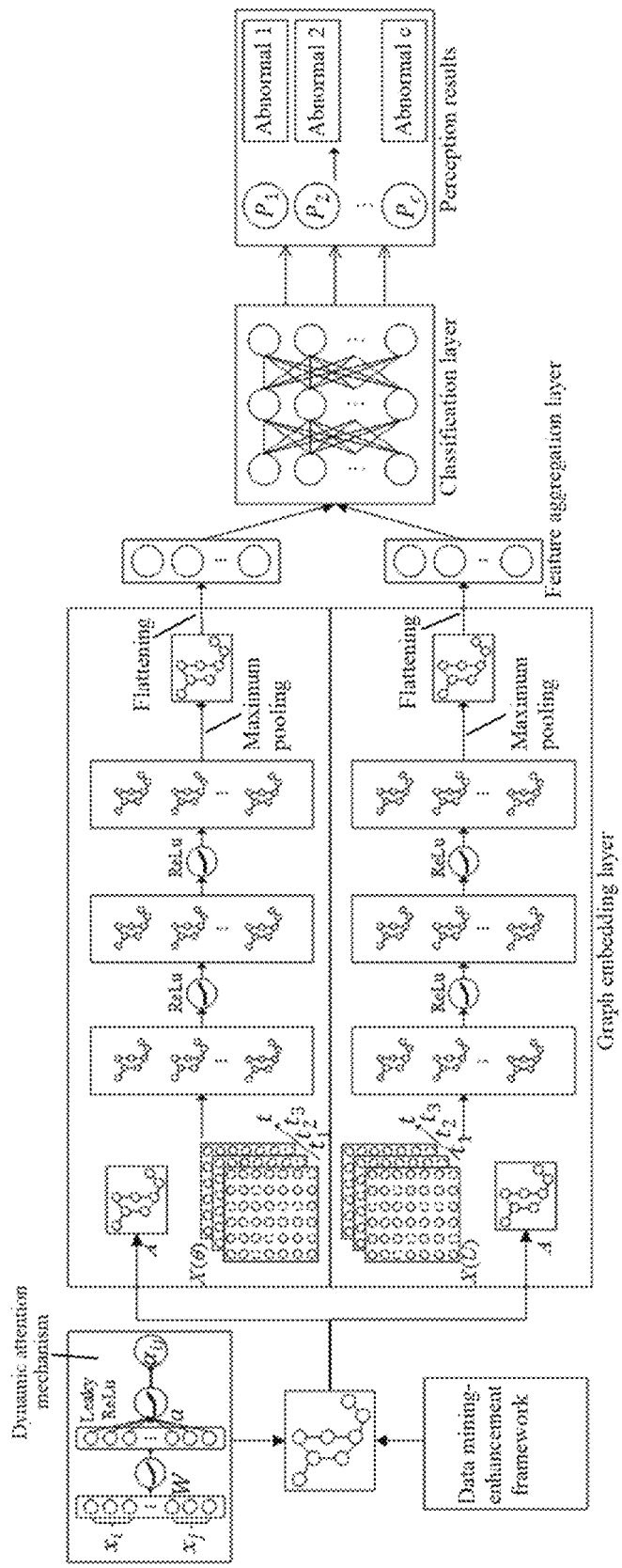
FIG. 4 is an architecture diagram of a classification model based on a dynamic graph attention network according to an example of the present disclosure.

In the present example, the above improved dynamic attention mechanism is configured to construct a dynamic graph attention network model for abnormal state perception. As shown in FIG. 4, the dynamic graph attention network model includes four parts: an attention layer based on the dynamic attention mechanism, a graph embedding layer, a feature aggregation layer, and a classification layer. The attention layer based on the dynamic attention mechanism includes two linear change layers, and the two linear change layers are separated by a nonlinear activation function. This network takes the labeled balanced data set provided by the data mining-enhancement framework as an input. First, an attention weight is given to the input node data through the attention layer based on the dynamic attention mechanism so as to enhance the feature extraction ability of the DGAT model; then feature extraction is performed on the amplitude and the phase of the voltage in the node data based on the graph embedding layer formed by three GAT layers; amplitude and phase features of the voltage in the node data are integrated through the feature aggregation layer; and finally, an operation state of each node is classified based on a classification layer formed by a multilayer perceptron (MLP), and operation state perception and classification results of each node are output. According to the perception results of all nodes in the network, the fault position can be rapidly positioned and the fault type can be identified.

Further, to improve the adaptability of the DGAT model on the unknown operation condition and enhance the intelligent perception ability of the unknown abnormal state, the present example provides a domain adaption method capable of achieving global and local feature alignment. According to the method, the Wasserstein distance, the maximum mean discrepancy (MMD) and the local maximum mean discrepancy (LMMD) are combined to train the DGAT model, which can effectively reduce the discrepancy of feature distribution between the source domain and the target domain, capture the potential complex time-space relationship in data, and enhance the generalization ability of the model.

(1) Maximum Mean Discrepancy

The maximum mean discrepancy is a method for measuring a distribution distance based on a kernel method. The discrepancy between the distributions is evaluated by mapping features of two distributions to a reproducing kernel Hilbert space (RKHS) and calculating the distance between the two feature distributions in the space, and global features of different distributions are aligned.

Assuming that the samples of two distributions are respectively X and Y, a continuous function in the sample space is expressed as $f$. The basic idea of MMD is to calculate mean function values of samples of different distributions on $f$, take the difference value between the two mean function values as a mean discrepancy of the two distributions corresponding to $f$, then find a continuous function $f$ that maximizes the mean discrepancy, and takes MMD as a test statistic to determine the similarity between the two distributions.

The calculation formula of MMD is shown in the following formula:

$$MMD[X, Y] = \sup_{f \in F} |E_p[f(X)] - E_q[f(Y)]| \tag{21}$$

Where, sup represents taking an upper bound value, and F represents a continuous function set in the sample space. Assuming that the source domain and the target domain respectively follow different distributions p and q, and the number of source domain and target domain samples are respectively $N_S$ and $N_T$. When a unit ball H on the reproducing kernel Hilbert space serves as F, the continuous function $f$ corresponding to the unit ball can be mapped to an infinite dimension, and then the expectation on $f(X)$ can obtain a high-order moment of a random variable, which is referred to as kernel embedding of the distribution. The data sample is mapped to RHKS, and the corresponding feature mapping is $\{\phi: X \to H\}$. Assuming that k a kernel function corresponding to RHKS, k meets the following properties:

$$f(X) = \langle f, \phi(X) \rangle_H \tag{22}$$

$$k(X,Y) = \langle \phi(X), \phi(Y) \rangle \tag{23}$$

Where, $\langle \cdot, \cdot \rangle$ represents an inner product, and $\phi(X)$ and $\phi(Y)$ are feature representations of extracted source domain and target domain samples. The calculation formula of MMD can be rewritten as:

$$MMD[X, Y] = \sup_{\|f\|_H \leq 1} |E_p\langle f, \phi(X)\rangle - E_q\langle f, \phi(Y)\rangle| = \tag{24}$$

$$\sup_{\|f\|_H \leq 1} |\langle f, E_p[\phi(X)] - E_q[\phi(Y)]\rangle| = \|E_p[\phi(X)] - E_q[\phi(Y)]\|$$

The expectation in the above formula is hard to obtain, but the sample mean can be used as an unbiased estimation of the expectation. Therefore, the empirical estimation of MMD can be adopted, as shown in the following formula:

$$\widehat{MMD}[F, X, Y] = \left\| \frac{1}{N_S} \sum_{i=1}^{N_S} \phi(x_i) - \frac{1}{N_T} \sum_{j=1}^{N_T} \phi(y_i) \right\| \tag{25}$$

in the above formula, $N_S$ and $N_T$ represent the number of source domain and target domain samples, respectively.

Where $\phi$ is a high-dimensional mapping function which is difficult to calculate, and thus the kernel function k is configured to correct the MMD formula to calculate the unbiased estimation of $MMD^2$:

$$\widehat{MMD}^2 = \tag{26}$$

$$\frac{1}{N_S^2} \sum_{i=1}^{N_S} \sum_{j=1}^{N_S} k(x_i, x_j) + \frac{1}{N_T^2} \sum_{i=1}^{N_T} \sum_{j=1}^{N_T} k(y_i, y_j) - \frac{2}{N_S N_T} \sum_{i=1}^{N_S} \sum_{j=1}^{N_T} k(x_i, y_i)$$

In conclusion, one distribution can be mapped to one point of RKHS, and the distance between two distributions can be expressed by the inner product of the point. The kernel function k is easy to calculate, and thus the calculation result of $MMD^2$ can be obtained rapidly.

(2) Local Maximum Mean Discrepancy

To align the local feature discrepancy to make the feature distributions of different abnormal types more consistent, in the present example, LMMD loss is added to the loss function of model training. LMMD, as a local variant of MMD, has the following calculation formula:

$$L\widehat{MMD}^2 = \frac{1}{C} \sum_{c=1}^{C} \left[ \sum_{i=1}^{N_S} \sum_{j=1}^{N_S} w_i^{sc} w_j^{sc} k(h_i^{sl}, h_j^{sl}) + \sum_{i=1}^{N_T} \sum_{j=1}^{N_T} w_i^{tc} w_j^{tc} k(h_i^{tl}, h_j^{tl}) - 2 \sum_{i=1}^{N_S} \sum_{j=1}^{N_T} w_i^{sc} w_j^{tc} k(h_i^{sl}, h_j^{tl}) \right] \tag{27}$$

Where, $h_i^{sl}$ and $h_i^{tl}$ respectively represent input features of the first layers of $x_i$ and $y_i$; $x_i$ and $y_i$ are the source domain and target domain samples, respectively; C is the total number of the abnormal categories; $w_i^{sc}$ and $w_i^{tc}$ are weights of $x_i$ and $y_i$ in the category c, which are respectively determined by the ratio of different categories in the source domain and the target domain. The calculation formula of $w_i^{sc}$ can be expressed as:

$$w_i^{sc} = \frac{z_{ic}}{\sum_{j=1}^{N_S} z_{jc}} \tag{28}$$

Where, $z_{ic}$ is the label of $x_i$. The target domain data is unsupervised data, so according to the idea of the pseudo label, the output $\hat{z}_i$ of the DGAT model is used to replace $z_i$ in the above formula.

(3) Wasserstein Distance

Wasserstein distance is a distance to measure the discrepancy between two probability distributions, which can further capture and align the global and local subtle distribution discrepancy and the topology structure discrepancy of the graph. Wasserstein distance is actually defined by solving an optimal transportation problem. Wasserstein distance can be expressed as the minimum transportation cost required to move the mass of one distribution to the other distribution.

First, according to the feature representations $\phi(X)$ and $\phi(Y)$ of the source domain and target domain samples extracted by DGAT, a distance matrix $D_{ij}$ between the source domain and target domain sample features is calculated, with the calculation formula as follows:

$$D_{ij} = \|\phi(x_i) - \phi(x_j)\| \tag{29}$$

Where, the distance matrix $D_{ij}$ also represents the cost of moving each source domain sample feature to each target domain sample feature.

To minimize the total transportation cost from the source domain to the target domain, it is necessary to find an appropriate transportation matrix γ, which represents a mass movement ratio from the source domain sample to the target domain sample. The element $\gamma_{ij}$ of the transportation matrix γ is required to meet the following side constraint:

$$\begin{cases} \sum_{i=1}^{N_S} \gamma_{ij} = \frac{1}{N_S} \\ \sum_{j=1}^{N_T} \gamma_{ij} = \frac{1}{N_T} \\ \gamma_{ij} \geq 0 \end{cases} \quad (30)$$

To minimize the total transportation cost, the transportation problem can be transformed into a linear programming problem. The minimum total transportation cost from the source domain to the target domain can be obtained by finding the optimal transportation matrix γ, that is, the final Wasserstein distance:

$$W(p, q) = \min_{\gamma \in \Pi(p,q)} \sum_{i=1}^{N_S} \sum_{j=1}^{N_T} \gamma_{ij} D_{ij} \quad (31)$$

Where, Π(p, q) represents a set of all transportation matrices meeting the side constraint.

In the training process of the classification model provided by the present example, the total loss function of the model includes a cross entropy classification loss based on the source domain sample, an MMD loss function and an LMMD loss function for domain adaption, and a Wasserstein distance loss function, which can be expressed as:

$$L = \frac{1}{N_S} \sum_{i=1}^{N_S} CE(g_\theta(x_i), z_i) + \alpha \cdot \widehat{MMD}^2 + \beta \cdot l\widehat{MMD}^2 + \lambda \cdot W(p, q) \quad (32)$$

Where, CE represents the cross entropy classification loss, and α, β and λ represent the weight coefficients of the MMD loss, the LMMD loss and the Wasserstein distance loss, respectively.

Figure 5:
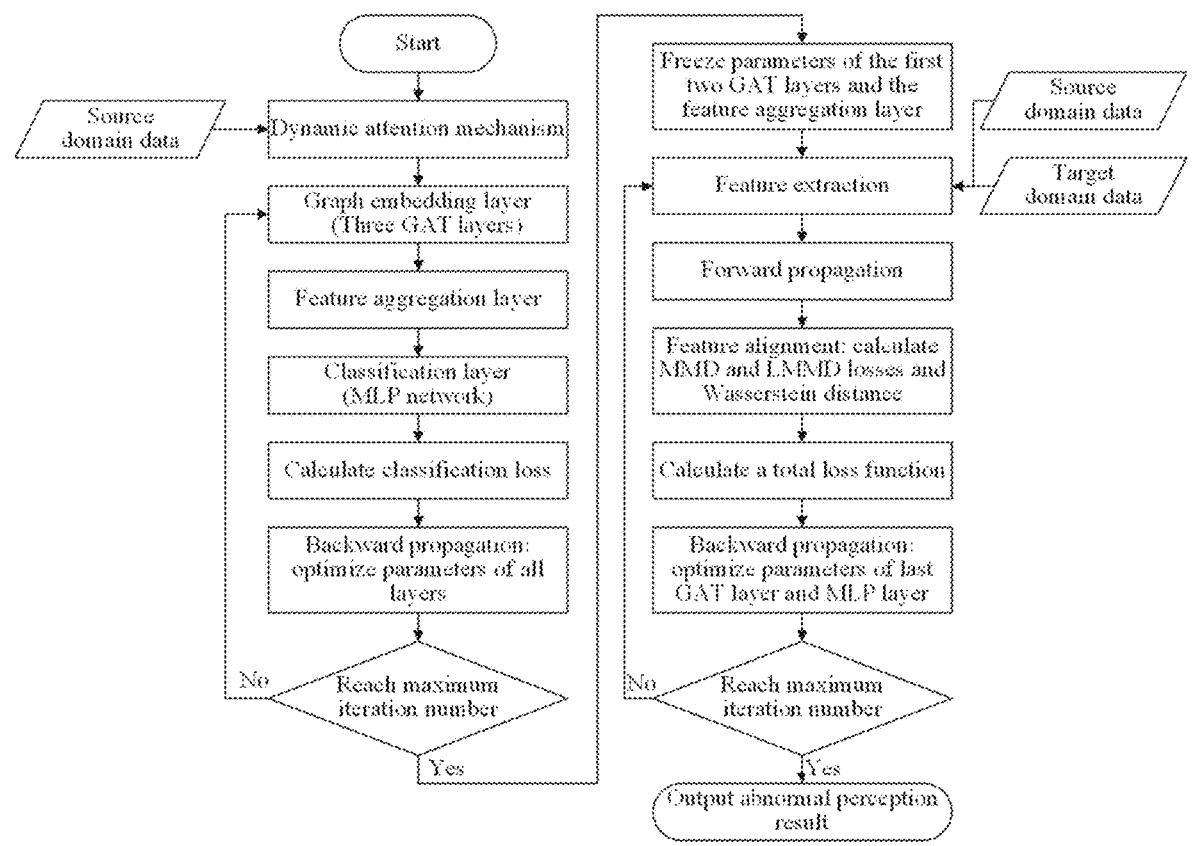
FIG. 5 is a flowchart of a classification model trained by a domain adaption method according to an example of the present disclosure.

Further, as shown in FIG. 5, training the classification model based on the dynamic graphic attention network by the domain adaption method includes two processes of pre-training and fine-tuning, including:

First, data in the balanced data set obtained on the basis of a data mining-enhancement framework is taken as source domain data, pre-training is performed by using the source domain data, and parameters of all layers in the dynamic graph attention network are optimized through multiple iterations of forward propagation and backward propagation until the model reaches a preset condition on the domain source data (or reaches the expected performance); and second, fine-tuning training is performed using the source domain data and the unlabeled target domain data, and in the fine-tuning process, the first two GAT layers in the pre-trained network is frozen, data features of the source domain and the target domain are extracted, and parameters of the last GAT layer, the feature aggregation layer and the classification layer are optimized through multiple iterations of forward propagation and backward propagation until the model also reaches the preset condition on the target domain data (or reaches the expected performance), thus completing the training of the classification model.

In addition, a loss function in the pre-training process is a cross entropy classification loss based on source domain node sample data; and a loss function of the fine-tuning process is the sum of the cross entropy classification loss based on the source domain node sample data, an MMD loss function and an LMMD loss function for domain adaption, and a Wasserstein distance loss function.

Step S5: acquiring data of each node of the active distribution network in the target domain, inputting the acquired data into the classification model, and outputting abnormal detection and classification results.

Step S6: analyzing, by the processor, the abnormal detection and classification results, determining the position of the node with the abnormal state in the active distribution network in the target domain and the category and severity of the abnormal state, and transmitting an abnormal state eliminating instruction to a distribution terminal of the active distribution network in the target domain.

Step S7: receiving, by the distribution terminal, the abnormal state eliminating instruction, and controlling a corresponding circuit breaker or load according to a predefined fault processing measure to break to eliminate the abnormal state.

Example 2

The present example provides a system for perceiving and eliminating an abnormal state of an active distribution network based on data enhancement, including:

a synchrophasor measurement device, mounted at each node of the active distribution network in a target domain and configured to acquire data of each node of the active distribution network in a target domain in real time; and a processor, including the following functional modules:

a data acquisition module, configured to acquire data of each node of the active distribution network after a fault occurs to construct structured graph data;

a data labeling module, configured to cluster data of each node in the graph data by means of dynamic clustering based on dynamic time warping, and generate a category label for data of each node by using a self-coding and label correction rule to construct a data set;

a balanced data set construction module, configured to determine unbalanced information of each abnormal category based on the constructed data set, and perform data enhancement on a minority category by a conditional generative adversarial network to acquire a labeled balanced data set after sample distribution adjustment;

a model training module, configured to train a classification model based on a dynamic graph attention network by taking data in the balanced data set as source domain data, combining unlabeled target domain data and using a domain adaption method; and an abnormal state perception module, configured to acquire real-time data of each node of the active distribution network in a target domain, input the acquired real-time data into a trained classification model, and output abnormal detection and classification results in real time.

wherein, the processor is configured to analyze the abnormal detection and classification results, to determine the position of the node with the abnormal state in the active distribution network in the target domain and the category and severity of the abnormal state, and to transmit an abnormal state eliminating instruction to a distribution terminal of the active distribution network in the target domain; and the distribution terminal is configured to receive the abnormal state eliminating instruction, and to control a corresponding circuit breaker or load according to a predefined fault processing measure to break to eliminate the abnormal state.

Each step in Example 2 corresponds to Example 1 of the method, and the specific examples can be referenced to the related description part of Example 1.

Those skilled in the art should know that the modules or steps of the present disclosure may be implemented by a universal computer device, and may optionally be implemented by programmable codes executable by a computing device, so that the modules or steps may be stored in a storage device for execution with the computing device, or may be respectively made into each integrated circuit module, or a plurality of modules or steps therein are made into a single integrated circuit module. The present disclosure is not limited to any specific hardware and software combination.

The above are only the preferred examples of the present disclosure. Although the specific examples of the present disclosure are described above with reference to the accompanying drawings, the descriptions of the specific examples are not intended to limit the scope of protection of the present disclosure. Those skilled in the art should appreciate that on the basis of the technical solution of the present disclosure, various modifications or variations made by those skilled in the art without creative labor are still within the scope of protection of the present disclosure.

The invention claimed is:

1. A method for eliminating an abnormal state of an active distribution network, comprising:
    acquiring, by a synchrophasor measurement device, data of each node of the active distribution network in a target domain in real time, and transmitting the acquired real-time data to a processor;
    inputting, by the processor, the acquired data into a trained classification model, and outputting abnormal detection and classification results in real time;
    analyzing, by the processor, the abnormal detection and classification results, determining the position of the node with the abnormal state in the active distribution network in the target domain and the category and severity of the abnormal state, and transmitting an abnormal state eliminating instruction to a distribution terminal of the active distribution network in the target domain; and
    controlling, by the distribution terminal after receiving the abnormal state eliminating instruction, a circuit breaker of a corresponding node to break, to eliminate the abnormal state;
    wherein, the classification model is a classification model based on a dynamic graph attention network (DGAT), and a training process of the classification model comprises:
    acquiring data of each node of the active distribution network after a fault occurs to construct structured graph data;
    clustering data of each node in the graph data by means of dynamic clustering based on dynamic time warping, and generating a category label for the data of the each node in the graph data by using a self-coding and label correction rule to construct a data set;
    determining unbalanced information of each abnormal category based on the data set, and performing data enhancement on a minority category by a conditional generative adversarial network to acquire a labeled balanced data set after sample distribution adjustment; and
    training the classification model based on the DGAT by taking data in the balanced data set as source domain data, combining unlabeled target domain data and using a domain adaption method;
    wherein, the DGAT comprises an attention layer based on a dynamic attention mechanism, a graph embedding layer comprising three layers of graph attention networks (GATs), a feature aggregation layer, and a classification layer, and training the classification model based on the DGAT by the domain adaption method comprises two processes of pre-training and fine-tuning, comprising:
    taking data in the balanced data set as source domain data, performing pre-training on the DGAT by using the source domain data, and optimizing parameters of all layers in the DGAT through multiple iterations of forward propagation and backward propagation until the classification model reaches a preset condition on the domain source data; and
    performing fine-tuning on the DGAT by using the source domain data and the unlabeled target domain data, and in the fine-tuning process, freezing the first two layers of the three layers of GATs in the pre-trained DGAT, extracting data features of the source domain and the target domain, and optimizing parameters of the last layer of the three layers of GATs, the feature aggregation layer and the classification layer through multiple iterations of forward propagation and backward propagation until the classification model also reaches the preset condition on the target domain data, thus completing the training of the classification model based on the DGAT;
    wherein, a loss function in the pre-training process is a cross entropy classification loss based on source domain node sample data, and a loss function of the fine-tuning process is the sum of the cross entropy classification loss based on the source domain node sample data, an maximum mean discrepancy (MMD) loss function and an local maximum mean discrepancy (LMMD) loss function for domain adaption, and a Wasserstein distance loss function.

2. The method for eliminating the abnormal state of the active distribution network according to claim 1, wherein the data of each node is timing voltage data of the node, and the voltage data comprises an amplitude and a phase of a voltage.

3. The method for eliminating the abnormal state of the active distribution network according to claim 1, wherein the acquiring the labeled balanced data set comprises:
    counting the number of node samples in each category in the data set according to the category label to obtain a frequency of each category;
    calculating a category weight of each category based on the frequency of each category, and screening a minority category in the abnormal category;
    taking the category label and the category weight as an additional condition variable of the conditional generative adversarial network, inputting a noise vector and the additional condition variable into a generator in the conditional generative adversarial network, controlling generation of unbalanced category node data through the category weight so as to generate sample data, jointly inputting the additional condition variable and the generated sample data or authentic sample data into a discriminator in the conditional generative adversarial network for discrimination, and performing alternating iterative training for the generator and the discriminator until reaching a maximum number of iterative rounds; and using the trained generator to generate balanced node data of the abnormal category to construct the labeled balanced data set.

4. The method for eliminating the abnormal state of the active distribution network according to claim 3, further comprising:

performing dynamic clustering on the data set again, and calculating and updating a clustering confidence and a category weight after clustering; and according to the updated cluster confidence and category weight, compared with a preset threshold condition, if the condition is met, taking the data set as the labeled balanced data set and acquiring the labeled balanced data set at current time; otherwise, performing clustering and generation again until the condition is met.

5. The method for eliminating the abnormal state of the active distribution network according to claim 1, wherein the attention layer based on the dynamic attention mechanism comprises two linear change layers, and the two linear change layers are separated by a nonlinear activation function; and the dynamic attention mechanism is:

$$e_{ij} = LeakyReLu(a^T(Wx_i|Wx_j)),$$

$$\alpha_{ij} = \text{Softmax}(e_{ij}) = \frac{\exp(e_{ij})}{\sum_{k \in n} \exp(e_{ik})},$$

where, $e_{ij}$ represents an attention score between nodes $V_i$ and $V_j$, $x_i$ represents node data of a $i^{th}$ node $V_i$; a represents the attention mechanism, which is one linear change layer, wherein T represents transpose of a matrix; $a_{ij}$ represents a learning weight after normalization of the attention score, with a value between an interval [0,1]; "Softmax" is a normalization function, "LeakyReLu" is an activation function; W represents the linear change of a node feature, which is the other linear change layer; $x_j$ represents node data of a $j^{th}$ node $V_j$; and, $e_{ik}$ represents an attention score between nodes $V_i$ and $V_k$.

6. The method for eliminating the abnormal state of the active distribution network according to claim 5, wherein using the labeled balanced data set as an input of the DGAT; firstly, giving an attention weight to an input node data through the attention layer based on the dynamic attention mechanism; then, performing feature extraction, by the graph embedding layer, on an amplitude and a phase of a voltage in the data of each node; integrating amplitude and phase features of the voltage in the data of each node through the feature aggregation layer; finally, classifying an operation state of each node based on the classification layer formed by a multilayer perceptron, and outputting operation state perception and classification results of each node.

* * * * *